(12) United States Patent
Lambaek et al.

(10) Patent No.: US 12,292,454 B2
(45) Date of Patent: May 6, 2025

(54) METHOD FOR OPERATING A LABORATORY AUTOMATION SYSTEM AND LABORATORY AUTOMATION SYSTEM

(71) Applicant: Roche Diagnostics Operations, Inc., Indianapolis, IN (US)

(72) Inventors: Ole Lambaek, Hagendorn (CH); Dominik Schnarwiler, Emmenbruecke (CH); Bert Taeymans, Aesch (CH)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 446 days.

(21) Appl. No.: 17/815,585

(22) Filed: Jul. 28, 2022

(65) Prior Publication Data

US 2023/0059570 A1     Feb. 23, 2023

(30) Foreign Application Priority Data

Aug. 19, 2021  (EP) .................................... 21192099

(51) Int. Cl.
   *G01N 35/00*  (2006.01)
(52) U.S. Cl.
   CPC ................ *G01N 35/0092* (2013.01)
(58) Field of Classification Search
   None
   See application file for complete search history.

(56) References Cited

U.S. PATENT DOCUMENTS

| | | | | |
|---|---|---|---|---|
| 10,012,666 B2* | 7/2018 | Riether | ............... | G01N 35/0092 |
| 10,261,103 B2* | 4/2019 | Pedain | ............... | G01N 35/04 |
| 10,352,953 B2* | 7/2019 | Huber | ............... | B65G 43/00 |
| 10,684,302 B2 | 6/2020 | Yamaguchi et al. | | |
| 2013/0128035 A1* | 5/2013 | Johns | ............... | B04B 15/00 |
| | | | | 348/135 |

(Continued)

FOREIGN PATENT DOCUMENTS

WO    2016/188752 A1    12/2016

OTHER PUBLICATIONS

European Search Report issued Feb. 4, 2022, in Application No. 21192099.6, 2 pp.

*Primary Examiner* — Alexander A Mercado
(74) *Attorney, Agent, or Firm* — Woodard, Emhardt, Henry, Reeves & Wagner, LLP (57) ABSTRACT

A method for operating a laboratory automation system, having: a control device and a transport system with carriers and a first empty carrier queue provided with a first fixed number of queue spaces, each assignable an empty carrier; the method comprising: providing additional queue spaces, each assignable an empty carrier, assigning a first number of additional queue spaces from the additional queue spaces to the first empty carrier queue, operating the first empty carrier queue with the first fixed number of queue spaces plus the first number of additional queue spaces, assigning, in response to receiving operation data in the control device, a second number of additional queue spaces from the additional queue spaces to the first empty carrier queue and operating the first empty carrier queue with the first fixed number of queue spaces plus the second number of additional queue spaces. Further, a laboratory automation system is provided.

15 Claims, 4 Drawing Sheets

(56) References Cited

U.S. PATENT DOCUMENTS

| | | |
|---|---|---|
| 2013/0197690 A1 | 8/2013 | Suzuki et al. |
| 2014/0234978 A1* | 8/2014 | Heise .................... G01N 35/04 422/65 |
| 2015/0369832 A1 | 12/2015 | Sacco |
| 2018/0074086 A1* | 3/2018 | Moore ................... G01N 35/04 |
| 2018/0246131 A1 | 8/2018 | Yamaguchi et al. |
| 2019/0170780 A1 | 6/2019 | Matsuka et al. |
| 2023/0160916 A1* | 5/2023 | Lambaek ............... G01N 35/04 422/67 |

* cited by examiner

METHOD FOR OPERATING A LABORATORY AUTOMATION SYSTEM AND LABORATORY AUTOMATION SYSTEM

CROSS-REFERENCE TO RELATED APPLICATION

This application claims priority to European Patent Application No. 21192099.6, filed 19 Aug. 2021, the disclosure of which is hereby incorporated by reference in its entirety.

TECHNICAL FIELD

The present disclosure refers to a method for operating a laboratory automation system. Further, the present disclosure refers to a laboratory automation system.

BACKGROUND

Laboratory automation systems are applied, in particular, for determining samples, for example samples of a bodily fluid, essentially automatically. The samples are typically received in sample vessels or containers which are processed via a laboratory automation system.

Such laboratory automation systems can comprise several units. Laboratory automation systems usually comprise several laboratory devices such as, for example, a pre-analytical, an analytical and/or a post-analytical device. Typically, the containers are transported between different devices of the system via a sample distribution system/sample transportation system. The sample vessels may be moved along a line of processing for processing, wherein the sample vessels and/or sample vessel carriers are moved by means of a transport device having one or more actuators and actuator drivers or driving devices for driving the actuator(s). For example, the sample vessels may be moved or relocated from a first working station to a second working station provided in the line of processing in the system. The working stations may also be referred to as working locations and may correspond to laboratory devices.

At present, only transport systems inside the laboratories are fully automated. The designs for those transport systems, however, are mostly rather simple, comprising static conveyor systems, wherein samples and sample containers/carriers, respectively, are moved along fixed routes. Usually, a set of routes along different analyzers/laboratory devices is defined (e.g., CCM paths). Hence, a specific sample/container/carrier can be assigned to a specific fixed route. The specific sample/container/carrier can be transported along this specific fixed route, can "step off" the route in proximity to a specific analyzer to be processed by the analyzer, and can "step on" the route again to be further transported along the specific fixed route until the end of the route is reached. The sample can then be, e.g., stored or wasted. Typically, due to the rather one dimensional processing, a specific logistics management for the samples/containers/carriers, is not required in such systems.

For complex transport systems, a specific logistics management for the samples/containers/carriers may be required.

SUMMARY

Although the embodiments of the present disclosure are not limited to specific advantages or functionality, it is noted that in accordance with the present disclosure a method for operating a laboratory automation system and a laboratory automation system with improved logistic management for carriers for sample containers are provided that provide a logistics management for more efficiently queuing and distributing (empty) carriers.

According to one embodiment, a method for operating a laboratory automation system is provided. The laboratory automation system comprises a plurality of laboratory devices configured to apply at least one of pre-analytics, analytics, and post-analytics for a sample received in a sample container, and a transport system, comprising a plurality of carriers each configured to carry one or more sample containers on an automation track to at least one of the plurality of laboratory devices, a plurality of transport system interfaces, and a first empty carrier queue provided with a first fixed number of queue spaces which each can be assigned an empty carrier. The laboratory automation system further comprises a control device configured to control operation of the transport system. The method for operating the laboratory automation system comprises providing a plurality of additional queue spaces in the transport system, the additional queue spaces each assignable an empty carrier, assigning a first number of additional queue spaces from the plurality of additional queue spaces to the first empty carrier queue by the control device, operating the first empty carrier queue with the first fixed number of queue spaces plus the first number of additional queue spaces during runtime of the transport system, receiving operation data in the control device, the operation data being indicative of a first operation parameter for at least one of the transport system and the plurality of laboratory devices during runtime of the transport system, in response to receiving the operation data, assigning a second number of additional queue spaces from the plurality of additional queue spaces to the first empty carrier queue by the control device, wherein the second number of additional queue spaces is different from the first number of additional queue spaces, and operating the first empty carrier queue with the first fixed number of queue spaces plus the second number of additional queue spaces during runtime of the transport system.

According to another embodiment, a laboratory automation system is provided. The laboratory automation system comprises a plurality of laboratory devices configured to apply at least one of pre-analytics, analytics, and post-analytics for a sample received in a sample container and a transport system, comprising a plurality of carriers each configured to carry one or more sample containers on an automation track to at least one of the plurality of laboratory devices, a plurality of transport system interfaces, and a first empty carrier queue provided with a first fixed number of queue spaces which each can be assigned an empty carrier. The laboratory automation system further comprises a control device configured to control operation of the transport system. The laboratory automation system is configured to provide a plurality of additional queue spaces in the transport system, the additional queue spaces each assignable an empty carrier, assign a first number of additional queue spaces from the plurality of additional queue spaces to the first empty carrier queue by the control device, operate the first empty carrier queue with the first fixed number of queue spaces plus the first number of additional queue spaces during runtime of the transport system, receive operation data in the control device, the operation data being indicative of a first operation parameter for at least one of the transport system and the plurality of laboratory devices during runtime of the transport system, in response to receiving the operation data, assign a second number of additional queue spaces from the plurality of additional queue spaces to the first empty carrier queue by the control device, wherein the second number of additional queue spaces is different from the first number of additional queue spaces, and operate the first empty carrier queue with the first fixed number of queue spaces plus the second number of additional queue spaces during runtime of the transport system.

The method for operating a laboratory automation system for operating and the laboratory automation system are provided to apply improved operation or management for the empty carrier queue provided with the number of queue spaces which each can be assigned an empty carrier. Additional queue spaces are assigned dynamically depending on one or more operation parameters for at least one of the transport system and the plurality of laboratory devices. Thus, an operation dependent number of queue spaces is made available for operating the laboratory automation system most efficiently. For different operation parameters the empty carrier queue is operated differently by assigning different number of additional queue spaces.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

In an embodiment, the transport system may comprise a transport plane assigned to the laboratory devices and providing support to the plurality of carriers. The sample container carriers can be placed on top of the transport plane for moving or travelling between plane locations or fields (automation track). The transport system may further comprise a driving device configured to move, in response to driving control signals, the plurality of carriers between plane positions or locations provided on the transport plane, in particular between laboratory devices. The transport plane may comprise a plurality of transport modules each provided with a transport surface. For example, 2 to 50 of laboratory devices may be provided. For example, 10 to 10000 (sample container) carriers may be provided.

The transport plane may comprise at least one transport plane region divided into grid areas. The grid areas may be of identical size and/or may be arranged in a chessboard manner. For example, the grid areas may have an N×N size with N being >2, for example, N=6. The grid areas may be rectangles or squares. One or more grid areas may correspond to one or more transport surfaces/modules. Each transport surface/transport module may exactly form one grid area. It may be intended that only one carrier may sit on one/each grid area. In addition or alternative, each grid area may only be reserved by and/or assigned to one carrier. Reserved grid areas may be blocked for other carriers, i.e., other carries are not allowed to move onto and/or reserve the blocked grid areas. Each queue space may correspond to a respective grid area. The transport plane may be a two dimensional transport plane. The transport plane may be planar, in particular completely planar. The carriers can be driven actively or passively. For example, 10 to 10000 grid areas may be provided.

The transport plane may comprise at least one transfer area located adjacent to a laboratory station (also called laboratory device) and/or an automatic transfer device. The transport plane may comprise 2 to 100 transfer areas. The transfer area may store a plurality of (container) carriers for sequentially processing by the laboratory device or the automatic transfer device. To each laboratory device, one transfer area may be assigned. Two or more laboratory devices may be assigned to the same transfer area. One (each) transfer area may comprise one or more grid areas. A first transfer area may comprise the first fixed number of queue spaces, the plurality of additional queue spaces, the first number of additional queue spaces, and/or the second number of additional queue spaces. More than one transfer area (location) may be assigned to a corresponding (the same) laboratory device, in particular an output transfer area and an input transfer area. The transfer areas may be statically or dynamically assigned to the laboratory devices. In other words, during operation, the transfer areas may be changed, if necessary.

The plurality of transport system interfaces may be assigned to the transport plane. The transport system interfaces may constitute the interfaces between the transport system (transport plane) and the laboratory devices. Via the transport system interfaces, empty carriers can be removed from the transport system (transport plane). Accordingly, empty carriers can be entirely removed from the transport system (transport plane) and/or can be loaded, e.g., with samples/containers. Each laboratory device may be assigned to one transport system interface. More than one laboratory device may be assigned to the same transport system interface. Each transport system interface may correspond to a transfer area. More than one transport system interface may correspond to the same transfer area. Via the transport system interfaces, empty carriers may (only) be removable from the corresponding transfer areas, in particular from the first fixed number of queue spaces, the plurality of additional queue spaces, the first number of additional queue spaces, and/or the second number of additional queue spaces. Accordingly, in the corresponding transfer areas, the empty carriers can be entirely removed and/or can be loaded, e.g., with samples/containers.

The control device may control the movement of the carriers, in particular, such that more than two carriers may be movable simultaneously and independently from one another (on the transport plane). Simultaneously may indicate that during a certain time interval at least two container carriers move. Independently may indicate that the container carriers may be moved, for example, in different directions, with different speeds, along different paths, and starting the movement at different points in time. The control device may be incorporated as a personal computer running control software. The control device may have information indicative of the positions of at least a part or all of the plurality of carriers.

From each grid area, the carriers may be able to move in the two horizontal and the two vertical directions. Alternatively, the carriers may only move in one horizontal and one vertical direction from each grid area. However, the permitted directions of movement do not have to be the same for each grid area. For example, at a first grid area, the carriers can only move up and to the right, and at a second grid area, the carriers can only move down and to the left.

Each queue space may constitute a destination grid area for a carrier path, i.e., the determined route for this carrier may end at this destination grid area. In particular, each queue space from the first fixed number of queue spaces, the plurality of additional queue spaces, the first number of additional queue spaces, and/or the second number of additional queue spaces may constitute a destination grid area for a carrier path. Alternatively, merely one of the first number of queue spaces plus the first or second number of additional queue spaces may constitute a destination grid area for a carrier path. Merely the space constituting the end of the queue of the first fixed number of queue spaces plus the first or second number of additional queue spaces may constitute a destination grid area for a carrier path. The end of the queue may be the first unoccupied/unreserved space of the first fixed number of queue spaces plus the first or second number of additional queue spaces, wherein the queue spaces are reserved/blocked in a predefined manner.

The assigning of the second number of additional queue spaces from the plurality of additional queue spaces to the first empty carrier queue may be conducted several times during runtime. The assigning may be conducted at regular intervals, in particular at regular time intervals. Consequently, the number of additional queue spaces assigned to the first empty carrier queue may be dynamic, in particular dynamically changed.

The empty carrier queue may also be referred to output queue. From the output queue empty carriers go to the laboratory devices. The empty carrier (output) queue guarantees a constant supply of empty carrier at the loading positions in order to allow the laboratory devices to reach their stated performance regarding throughput. This empty carrier queue may not need random access, and it can be of type FIFO ("First In First Out") or LIFO ("Last In First Out").

The method (for operating a laboratory automation system) may further comprise, in the control device, receiving a request for queuing a first carrier in the first empty carrier queue, determining a travel time for the first carrier for travelling from a current location to the location of the of the first empty carrier queue in the transport system, and assigning the first carrier to one of the first number of additional queue spaces and the second number of additional queue spaces, if the travel time is exceeding a threshold travel time.

Otherwise, if the travel time does not exceeding the threshold travel time, the first carrier may be assigned to the first fixed number of queue spaces. Accordingly, the method may further comprise, in the control device, receiving a request for queuing a second carrier in the first empty carrier queue, determining a travel time for the second carrier for travelling from a current location to the location of the first empty carrier queue in the transport system, and assigning the first carrier to the first fixed number of queue spaces, if the travel time is not exceeding the threshold travel time. The threshold may be predetermined. The travel time may be indicative of the distance between the carrier's current location and its corresponding empty carrier queue. The travel time may also be indicative of the carrier's route and its travel speed. Assigning a carrier to the first fixed number of queue spaces may correspond to assigning this carrier to a first space of the first fixed number of queue spaces. Accordingly, for this carrier, the first space of the first fixed number of queue spaces may correspond to the carrier's destination. The first space of the first fixed number of queue spaces may be reserved for the corresponding carrier. Analogously, assigning a carrier to one of the first number of additional queue spaces and the second number of additional queue spaces may correspond to assigning this carrier to a first space of the first number of additional queue spaces or the second number of additional queue spaces. Accordingly, for this carrier, the first space of the first number of additional queue spaces or the second number of additional queue spaces may correspond to the carrier's destination. The first space of the first number of additional queue spaces or the second number of additional queue spaces may be reserved for the corresponding carrier.

The current carrier location may be the carrier's location at the time of receiving the request for queuing the carrier or at the time of determining the travel time for this carrier. Alternatively, the current carrier location may be the carrier's location at the time the method starts, at the time of receiving the operation data, or at the time of assigning a second number of additional queue spaces from the plurality of additional queue spaces to the first empty carrier queue. The current location of the carrier can be (re-)determined when needed.

The location of the first empty carrier queue can be defined by an unoccupied space of the first fixed number of queue spaces. If more than one space of the first fixed number of queue spaces are unoccupied, the unoccupied space being located closest to the respective device and/or transport system interface may be the location of the first empty carrier queue. Generally or if all spaces of the first fixed number of queue spaces are occupied, an unoccupied space of the first number of additional queue spaces or the second number of additional queue spaces may be the location of the first empty carrier queue. If more than one space of the first number of additional queue spaces or the second number of additional queue spaces are unoccupied, the unoccupied space being located closest to the respective device and/or transport system interface may be the location of the first empty carrier queue. Generally or if the first fixed number of queue spaces and the first number of additional queue spaces or the second number of additional queue spaces are occupied, the space of the first fixed number of queue spaces being located closest to the respective device and/or transport system interface may be the location of the first empty carrier queue. In this case, alternatively, the respective device or transport system interface, the geometric center of the first fixed number of queue spaces, the geometric center of the first fixed number of queue spaces together with the first number of additional queue spaces or the second number of additional queue spaces, the geometric center of the first number of additional queue spaces or the second number of additional queue spaces, or the geometric center of the respective transfer area may be the location of the first empty carrier queue. Occupied spaces may be spaces that are physically occupied by other carriers and/or spaces that are reserved by other carriers.

The providing of the plurality of additional queue spaces may further comprise providing a plurality of additional shared queue spaces shared between the first empty carrier queue and a second empty carrier queue of the transport system, the second empty carrier queue provided with a second fixed number of queue spaces which each can be assigned an empty carrier in the transport system.

All of the plurality of additional queue spaces may be shared queue spaces. The providing of the plurality of additional queue spaces may further comprise providing a plurality of additional shared queue spaces shared between the first empty carrier queue and further empty carrier queues of the transport system, the further empty carrier queues provided with further fixed numbers of queue spaces, each assignable to an empty carrier in the transport system. The first empty carrier queue may be assigned to a first transport system interface and/or laboratory device and the second empty carrier queue may be assigned to a second transport system interface and/or laboratory device. Alternatively, the first and second empty carrier queue may both be assigned to the same transport system interface and/or laboratory device. The plurality of additional queue spaces may comprise two groups of queue spaces. The first group of queue spaces may correspond to the first empty carrier queue and the second group of queue spaces may correspond to the second empty carrier queue. The first group of queue spaces and the second group of queue spaces can have an intersection. Alternatively, the first group of queue spaces and the second group of queue spaces may not have an intersection.

The method may further comprise dynamically assigning, by the control device, one or more additional shared queue spaces from the plurality of additional shared queue spaces to both the first empty carrier queue and the second empty carrier queue depending on at least one of the first operation parameter and a second operation parameter for at least one of the transport system and the plurality of laboratory devices at runtime.

The receiving of the operation data in the control device may further comprise one of the first operation parameter and the second operation parameter being indicative of at least of the following operation parameters: (i) a physical filling level for at least one of the first empty carrier queue and the second empty carrier queue, the physical filling level indicating the number of empty carriers provided in the first empty carrier queue/second empty carrier queue, (ii) a virtual filling level for at least one of the first empty carrier queue and the second empty carrier queue, the virtual filling level indicating a total number of empty carriers assigned to the first empty carrier queue/second empty carrier queue, namely the number of empty carriers provided in the first empty carrier queue/second empty carrier queue plus a number of empty carriers travelling to the first empty carrier queue/second empty carrier queue, (iii) a first additional queue space capacity indicating a first remaining number of additional queue spaces from the first number of additional queue spaces not assigned by an empty carrier, (iv) a second additional queue space capacity indicating a second remaining number of additional queue spaces from the second number of additional queue spaces not assigned by an empty carrier, (v) a number of empty carriers which left one of the first empty carrier queue and the second empty carrier queue over an observation time period.

The number of empty carriers which left one of the first empty carrier queue and the second empty carrier queue over an observation time period can correspond to the number of empty carriers which left one of the first empty carrier queue and the second empty carrier queue in an output direction via at least one of the first and second transport system interface per time unit. Leaving (empty) carriers may be (empty) carriers that are entirely leaving the transport system and/or transport plane, and/or (empty) carriers that are getting loaded.

The first remaining number of additional queue spaces from the first number of additional queue spaces not assigned by an empty carrier may be indicative of additional queue spaces from the first number of additional queue spaces that are not physically occupied by carriers. Alternatively, the first remaining number of additional queue spaces from the first number of additional queue spaces not assigned by an empty carrier may be indicative of additional queue spaces from the first number of additional queue spaces that are not physically occupied by carriers and not reserved by carriers. The second remaining number of additional queue spaces from the second number of additional queue spaces not assigned by an empty carrier may be indicative of additional queue spaces from the second number of additional queue spaces that are not physically occupied by carriers. Alternatively, the second remaining number of additional queue spaces from the second number of additional queue spaces not assigned by an empty carrier may be indicative of additional queue spaces from the second number of additional queue spaces that are not physically occupied by carriers and not reserved by carriers.

The first operation parameter and the second operation parameter may further be indicative of at least of the following operation parameters: (i) a first additional queue capacity being indicative of the first number of additional queue spaces corresponding to the first empty carrier queue and/or the second empty carrier queue, (ii) a second additional queue capacity being indicative of the second number of additional queue spaces corresponding to the first empty carrier queue and/or the second empty carrier queue, (iii) a physical filling level of the first number of additional queue spaces being indicative of carriers that are physically located on spaces of the first number of additional queue spaces, (iv) a physical filling level of the second number of additional queue spaces being indicative of carriers that are physically located on spaces of the second number of additional queue spaces, (v) a virtual filling level of the first number of additional queue spaces being indicative of a total number of (empty) carriers assigned to the first number of additional queue spaces, namely the number of (empty) carriers provided on spaces of the first number of additional queue spaces plus a number of (empty) carriers travelling to the first number of additional queue spaces, i.e., the number of (empty) carriers located on spaces of the first number of additional queue spaces plus a number of spaces of the first number of additional queue spaces reserved by carriers (merely unoccupied spaces may be reservable), (vi) a virtual filling level of the second number of additional queue spaces being indicative of a total number of (empty) carriers assigned to the second number of additional queue spaces, namely the number of (empty) carriers provided on spaces of the second number of additional queue spaces plus a number of (empty) carriers travelling to the second number of additional queue spaces, i.e., the number of (empty) carriers located on spaces of the second number of additional queue spaces plus a number of spaces of the second number of additional queue spaces reserved by carriers, (vii) a number of empty carriers which left one of the first empty carrier queue and the second empty carrier queue over an observation time period, but not via at least one of the first and second transport system interface, (viii) length of one of the first empty carrier queue and the second empty carrier queue.

The length of the carrier queues (first/second) may be below 30, typically between 8 and 25, more typically 9, 10, 11, 12, or 13. The fixed number of queue spaces may define the (static) length of the corresponding empty carrier queue.

The assigning of the first number of additional queue spaces may comprise at least one of the following: assigning a first number of additional queue spaces which is zero at the time of starting runtime, and assigning a first number of additional queue spaces which is non-zero.

The method may further comprise, in the control device, at last one of the following: assigning the first empty carrier queue a first transport system interface from the plurality of transport system interfaces, and assigning the second empty carrier queue a second transport system interface from the plurality of transport system interfaces, wherein the second transport system interface is different from the first transport system interface.

The assigning of the second number of additional queue spaces may further comprise, in the control device, determining the second number of additional queue spaces ($L_{additional}$) as follows:

$$L_{additional} = \frac{\dot{Q}_{TSIF}}{\dot{Q}_{TSIF,max}} \cdot \frac{D_{average,TSIF}}{D_{avergae}} \cdot L_{additional,ref},$$

wherein: $\dot{Q}_{TSIF}$ is the number of empty carriers leaving the first empty carrier queue in an output direction via the first transport system interface per time unit/interval, $\dot{Q}_{TSIF,max}$ is the maximum number of empty carriers leaving the first empty carrier queue in an output direction via the first transport system interface per time interval/unit, $D_{average,TSIF}$ is the average distance between the first transport system interface assigned to the first empty carrier queue and the other transport system interfaces from the plurality of transport system interfaces, $D_{average}$ is the average distance between pairs of transport system interfaces from the plurality of transport system interfaces, and $L_{additional,ref}$ is a reference number of additional queue spaces.

The time unit/interval may be, for example, 1 s (second) or 1 h (hour). However, other time units/intervals are also possible. A reference time may be determined. A time interval starting from the reference time and ending at the current time may be determined ($\Delta t_{current-reference} = t_{current} - t_{reference}$). The unit of the time interval may be hour or seconds. A number of empty carriers ($N_{carrier,leaving}$) leaving the first empty carrier queue in an output direction via the first transport system interface during the time interval may be determined. $\dot{Q}_{TSIF}$ may be calculated by dividing the number of empty carriers leaving the first empty carrier queue in an output direction via the first transport system interface during the time interval by the time interval: $N_{carrier,leaving}/\Delta t_{current-reference}$. The reference time may be replaced by the current time in regular time periods. This replacement may correspond to a resetting of $\dot{Q}_{TSIF}$. The regular time period $t_{reset}$ may be pre-defined and may be, for example, 360 s. A counter that successively counts the empty carriers that are leaving the first empty carrier queue in an output direction via the first transport system interface ($N'_{carrier,leaving}$), and a timer that successively measures the elapsed time ($\Delta t'$) may be provided. The timer may count hours or seconds. Each time the time period $t_{reset}$ expires, the counter and the timer may be set to zero. This may correspond to a resetting of $\dot{Q}_{TSIF}$. $\dot{Q}_{TSIF}$ may also be calculated by $N'_{carrier,leaving}/\Delta t'$.

$\dot{Q}_{TSIF,max}$ may be a pre-defined quantity. $\dot{Q}_{TSIF,max}$ may be fixed during runtime. However, $\dot{Q}_{TSIF,max}$ may be updated if the respective laboratory device/transport system interface has been replaced. $\dot{Q}_{TSIF,max}$ can be pre-set to a value between 10 and 10000 carriers per hour, typically to a value between 500 and 3000 carriers per hour, more typically to a value between 1000 and 2000 carriers per hour.

$D_{average,TSIF}$ may be a pre-defined quantity. $D_{average,TSIF}$ may be fixed during runtime. However, $D_{average,TSIF}$ may be updated if the layout of the transport system has been amended. The distances between each of the other transport system interfaces to the transport system interface assigned to the first empty carrier queue can be determined. The mean, median, or mode of these distances can be determined and can define $D_{average,TSIF}$. $D_{average}$ may be a pre-defined quantity. $D_{average}$ may be fixed during runtime. However, $D_{average}$ may be updated if the layout of the transport system has been amended. In particular, $D_{average}$ may be the average distance between all possible pairs of transport system interfaces from the plurality of transport system interfaces (without repetition). It is noted that $D_{average}$ may be the mean, median, or mode of the distances between (all possible) pairs of transport system interfaces from the plurality of transport system interfaces (without repetition).

The reference number of additional queue spaces ($L_{additional,ref}$) may be determined as follows:

$$L_{additional,ref} = \max\left(1, \frac{D_{max} + D_{average}}{6}\right),$$

wherein $D_{max}$ is the maximum distance between a pair of transport system interfaces from the plurality of transport system interfaces.

$D_{max}$ may be a pre-defined quantity. $D_{max}$ may be fixed during runtime. However, $D_{max}$ may be updated if the layout of the transport system has been amended.

The method may further comprise limiting the second number of additional queue spaces ($L_{additional}$) as follows: $L_{additional} \leq 2 \cdot L_{additional,ref}$.

The assigning of the second number of additional queue spaces may further comprise assigning the second number of additional queue spaces in response to an empty carrier leaving the first empty carrier queue.

The assigning may be repeated. The assigning may be repeated each time an empty carrier is leaving the first empty carrier queue. The second number of additional queue spaces may replace the first number of additional queue spaces. The "new"/re-calculated second number of additional queue spaces may replace the "old" second number of additional queue spaces. The assigning may be repeated each time an empty carrier is leaving one of the first fixed number of queue space and/or the second number of additional queue spaces. The assigning may be repeated each time an empty carrier is physically leaving the first empty carrier queue and/or an empty carrier of the first empty carrier queue is getting loaded. The assigning may be repeated each time an empty carrier is physically leaving one of the first fixed number of queue space and/or the second number of additional queue spaces and/or an empty carrier located on one of the first fixed number of queue space and/or the second number of additional queue spaces is getting loaded.

The assigning of the second number of additional queue spaces may further comprise assigning the second number of additional queue spaces in response to an empty carrier reaching the first empty carrier queue and/or to an empty carrier being assigned to the first empty carrier queue. The assigning may be repeated each time an empty carrier is reaching the first empty carrier queue and/or an empty carrier is assigned to the first empty carrier queue. The assigning may be repeated each time an empty carrier is reaching and/or is assigned to one of the first fixed number of queue space and/or the second number of additional queue spaces. A carrier that is physically located at a certain space and/or that reserves a certain space may be assigned to that certain space.

Alternatively or in addition, the assignment may be repeated in regular time intervals, for example, every second. However, the time interval can also be anywhere between 0.1 seconds and 1 minute.

The method may further comprise providing the plurality of carriers with single sample container carriers.

The operating of the first empty carrier queue may further comprise, in the control device, directing or guiding one or more empty carriers located distant from the first empty carrier queue to travel to the first empty carrier queue, if the second number of additional queue spaces is determined to be higher than the first number of additional queue spaces and/or the second additional queue space capacity is greater than zero.

The operating of the first empty carrier queue may further comprise, in the control device, preventing one or more empty carriers located distant from the first empty carrier queue from traveling to the first empty carrier queue, if the second number of additional queue spaces is determined to be smaller than the first number of additional queue spaces and/or the second additional queue space capacity is zero.

Alternatively, the operating of the first empty carrier queue may comprise, in the control device, not actively directing one or more empty carriers located distant from the first empty carrier queue to travel to the first empty carrier queue, if the second number of additional queue spaces is determined to be higher than the first number of additional queue spaces and/or the second additional queue space capacity is greater than zero. The operating of the first empty carrier queue may further comprise, in the control device, not actively preventing one or more empty carriers located distant from the first empty carrier queue from traveling to the first empty carrier queue, if the second number of additional queue spaces is determined to be smaller than the first number of additional queue spaces and/or the second additional queue space capacity is zero.

Empty carriers, in particular empty carriers newly introduced into the system, can be pushed to the empty carrier queue that needs them the most. The empty carrier(s), in particular the empty carrier(s) newly introduced into the system, may be pushed to the empty carrier queue with the highest additional queue space capacity.

The operating of the first empty carrier queue may further comprise, in the control device, directing one or more empty carriers located distant from the first empty carrier queue to travel to the first empty carrier queue, if (i) the first empty carrier queue has the highest additional queue space capacity compared to its additional queue capacity of the plurality of empty carrier queues of the system and/or (ii) the first empty carrier queue has the highest number of empty spaces from the fixed number of queue spaces plus the first/second number of additional queue spaces compared to the total number of the fixed number of queue spaces plus the first/second number of additional queue spaces among the plurality of empty carrier queues of the system.

The operating of the first empty carrier queue may further comprise, in the control device, preventing one or more empty carriers located distant from the first empty carrier queue from traveling to the first empty carrier queue, if (i) another empty carrier queue of the plurality of empty carrier queues of the system has higher additional queue space capacity compared to its additional queue capacity than the first empty carrier queue and/or (ii) the other empty carrier queue has the higher number of empty spaces from the fixed number of queue spaces plus the first/second number of additional queue spaces compared to the total number of the fixed number of queue spaces plus the first/second number of additional queue spaces.

On the basis of the additional queue space capacity and/or the number of empty spaces among the fixed number of queue spaces plus the first/second number of additional queue spaces a factor can be determined for each empty carrier queue, indicative of the empty carrier need of each empty carrier queue. The empty carrier queue with the largest empty carrier need factor can be assigned to the next empty carrier. The distance of the entry point of the next empty carrier to respective empty carrier queues can have an inversely proportional effect on the corresponding empty carrier need factors. In other words, the empty carrier need factor of a certain empty carrier queue can increase more the nearer the entry point of the next carrier is to the certain empty carrier queue.

The system may comprise a plurality of empty carrier queues. The above-described embodiments for the first empty carrier queue may analogously apply to any of the plurality of empty carrier queues.

The total number of available queue spaces for an empty carrier may be given by the corresponding fixed number of queue spaces plus the corresponding first/second number of additional queue spaces.

It may be provided that spaces of the first/second number of additional queue spaces assigned to carriers (corresponding to the same transport system interface) are only adjacent to spaces that are not assigned to carriers (corresponding to the same transport system interface). It may be provided that spaces of the first/second number of additional queue spaces physically occupied by carriers (corresponding to the same transport system interface) are only adjacent to spaces that are not physically occupied by other carriers (corresponding to the same transport system interface). Carriers corresponding to the same first/second number of additional queue spaces may not be (physically/virtually) located on adjacent spaces.

An upper limit of the total number of (empty) carriers of the system may be provided. The following limitation on the total number of (empty) carriers may be provided:

$$N_{carrier} \leq \min\left(N_{SharedQueueFields}, N_{TSIF} \cdot L_{Q,carrier,out} + \frac{N_{SharedQueueFields}}{2}\right).$$

Herein, $N_{carrier}$ is the total number of (empty) carriers. $N_{SharedQueueFields}$ is the total number of the plurality of additional shared queue spaces. $N_{SharedQueueFields}$ may be the number of all additional queue spaces. The total number of the plurality of additional shared queue spaces may correspond to the total number of the plurality of additional queue spaces. $N_{TSIF}$ is the total number of transport system interfaces of the system and $L_{Q,carrier,out}$ is the corresponding fixed number of queue spaces, for example, 11. $N_{TSIF}$ and $L_{Q,carrier,out}$ may be pre-defined and may be fixed values. For a given total number of (empty) carriers, the above inequality can provide a lower bound for the total number of the plurality of additional shared queue spaces.

A lower limit of the total number of (empty) carriers of the system may be provided. The following limitation on the total number of (empty) carriers may be provided:

$$N_{carrier} \geq N_{TSIF} \cdot L_{Q,carrier,out}$$

Both the upper and the lower limitation may apply. The lower limitation may especially apply for small transport systems. For a given total number of (empty) carriers, the above inequality can provide an upper bound for the total number of transport system interfaces of the system and the total number of the corresponding fixed number of queue spaces, respectively.

The number of totally needed (empty) carriers can be expressed as a function of the number of transport modules:

$$N_{carrier} = 6.6 \cdot N_{TSTM}^{0.88}$$

Herein, $N_{TSTM}$ is the total number of transport modules. The total number of transport modules can be, for example, between 24 to 1276. The transport module may each be provided with N×N (logical) fields of spaces which can be occupied by a carrier. For example, a number of 6×6 fields may be provided by each of the transport modules.

Prior to resetting $\dot{Q}_{TSIF}$, the second number of additional queue spaces may be assigned to the first empty carrier queue, in particular if the second number of additional queue spaces is smaller than the first number of additional queue space. If neither the first fixed number of queue spaces nor the first/second number of additional queue spaces is occupied by any empty carrier prior to resetting $\dot{Q}_{TSIF}$, $\dot{Q}_{TSIF}$ may be set to $\dot{Q}_{TSIF,max}$ when assigning the second number of additional queue spaces to the first empty carrier queue. After the resetting, the second number of additional queue spaces may not be assigned to the first empty carrier queue for a certain time span, for example, for the following 10 seconds.

Each queue can have a predefined workflow that defines the order in which the carriers assigned to this queue leave the queue. Carriers of the queue, which according to workflow are the last to leave the queue, can form the end of the queue.

In connection with the laboratory automation system, the embodiments described above in connection with the method for operating a laboratory automation system may be provided accordingly.

In order that the embodiments of the present disclosure may be more readily understood, reference is made to the following examples, which are intended to illustrate the disclosure, but not limit the scope thereof.

Figure 1:
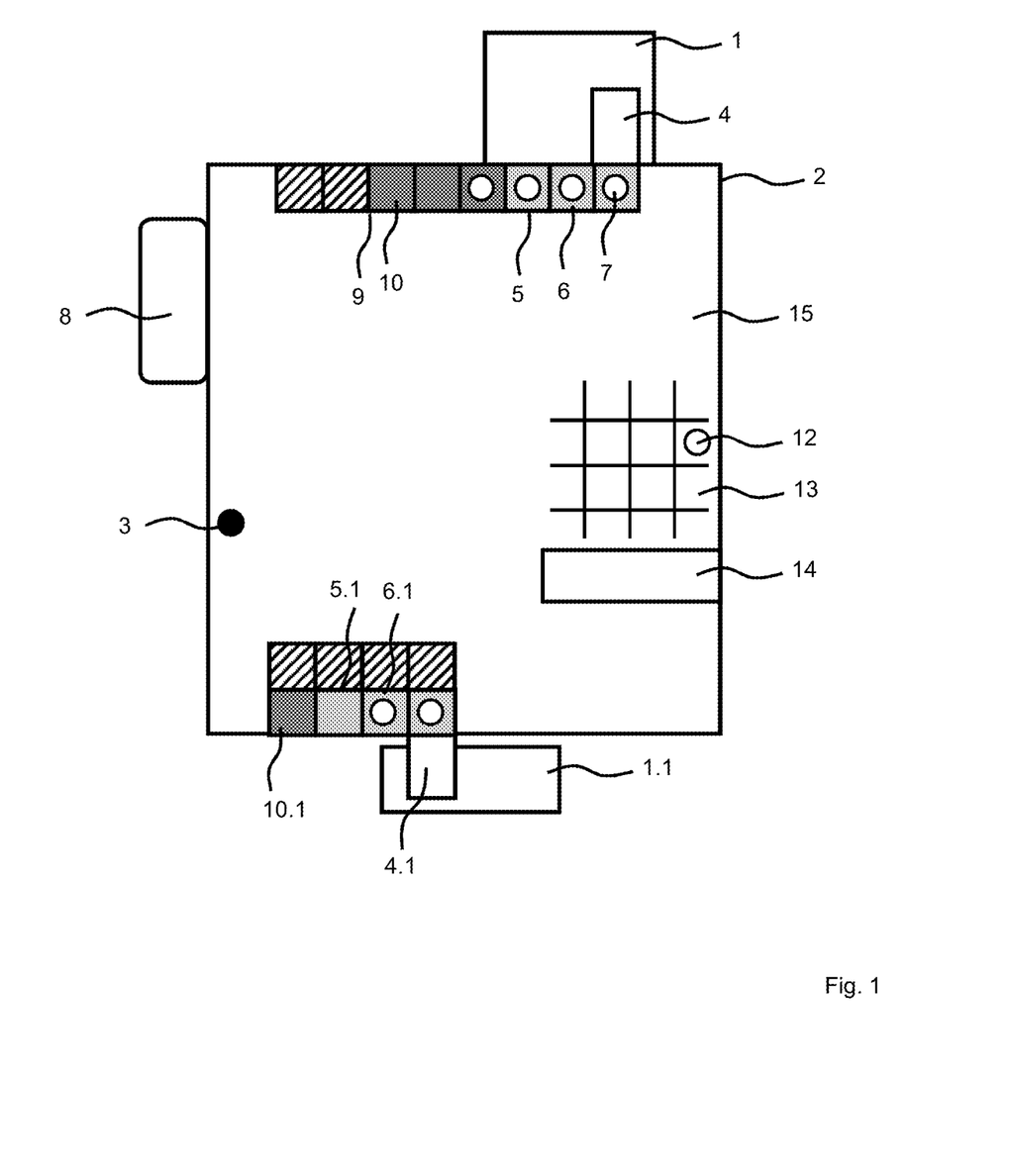
FIG. 1 is a graphical representation of a laboratory automation system with a first example of empty carrier queues.

FIG. 1 shows a graphical representation of a laboratory automation system with a first example of empty carrier queues. The laboratory automation system comprises a plurality of laboratory devices 1 configured to apply at least one of pre-analytics, analytics, and post-analytics for a sample received in a sample container. The system further comprises a transport system 2. The transport system 2 comprises a plurality of carriers 3 each configured to carry one or more sample containers on an automation track to at least one of the plurality of laboratory devices 1, a plurality of transport system interfaces 4, and a first empty carrier queue 5 provided with a first fixed number of queue spaces 6 which each can be assigned an empty carrier 7. Additionally, the laboratory automation system comprises a control device 8 configured to control operation of the transport system 2.

FIG. 1 also shows a second empty carrier queue 5.1 provided with a second fixed number of queue spaces 6.1 which each can be assigned an empty carrier 7.1. In FIG. 1, the first empty carrier queue 5 is assigned to the first laboratory device 1 and to the first transport system interface 4. The second empty carrier queue 5.1 is assigned to the second laboratory device 1.1 and to the second transport system interface 4.1. A length or extension of the first empty carrier queue 5, according to the example illustrated in FIG. 1, is three spaces. However, the length of the first empty carrier queue 5 is not limited to three spaces. Additional queue spaces 9 are provided.

In FIG. 1, to the first empty carrier queue 5 a first number of additional queue spaces 10 among the additional queue spaces 9 is assigned. The first empty carrier queue 5 is operated with the first fixed number of queue spaces 6 plus the first number of additional queue spaces 10. Likewise, to the second empty carrier queue 5.1 a first number of additional queue spaces 10.1 is assigned. The second empty carrier queue 5.1 is operated with the second fixed number of queue spaces 6.1 plus the first number of additional queue spaces 11.1 of the second empty carrier queue 5.1. The fixed number of queue spaces 6.1 of the second empty carrier queue 5.1 is the same as the fixed number of queue spaces 6 of the first empty carrier queue 5. However, the fixed number of queue spaces 6.1 of the second empty carrier queue 5.1 may be different from the fixed number of queue spaces 6 of the first empty carrier queue 5. The first number of additional queue spaces 10 assigned to the first empty carrier queue 5 is different, e.g., higher, than the first number of additional queue spaces 10.1 assigned to the second empty carrier queue 5.1. The first number of additional queue spaces 10 assigned to the first empty carrier queue 5 may be higher than the first number of additional queue spaces 10.1 assigned to the second empty carrier queue 5.1, since, for example, the laboratory device 1/transport system interface 4 assigned to the first empty carrier queue 5 may have a higher empty carrier consumption and/or the laboratory device 1/transport system interface 4 assigned to the first empty carrier queue 5 may be further away from the empty carrier source 12. However, during operation, the first number of additional queue spaces 10 assigned to the first empty carrier queue 5 and the first number of additional queue spaces 10.1 assigned to the second empty carrier queue 5.1 may be (repeatedly) re-assigned to the respective empty carrier queues 5, 5.1. Thus, during operation, the first number of additional queue spaces 10 assigned to the first empty carrier queue 5 and the first number of additional queue spaces 10.1 assigned to the second empty carrier queue 5.1 may change. The re-assignment may take place independently for the several empty carrier queues 5, 5.1.

The transport system 2 has a transport plane 15. The transport plane 15 comprises a plurality of transport modules 14. In addition, the transport plane 15 is divided in logical fields, namely grid areas 13. Each transport module 14 can comprise exactly one or more than one grid areas 13. To each grid area 13 one carrier 3, in particular exclusively one carrier 3, may be assigned to. The carriers 3 can be moved on the transport plane 15 by being moved from one grid area 13 to another. Each grid area 13 can from one queue space, in particular exclusively one queue space. In the transport system 2, also loaded carriers 3 are provided.

Figure 2:
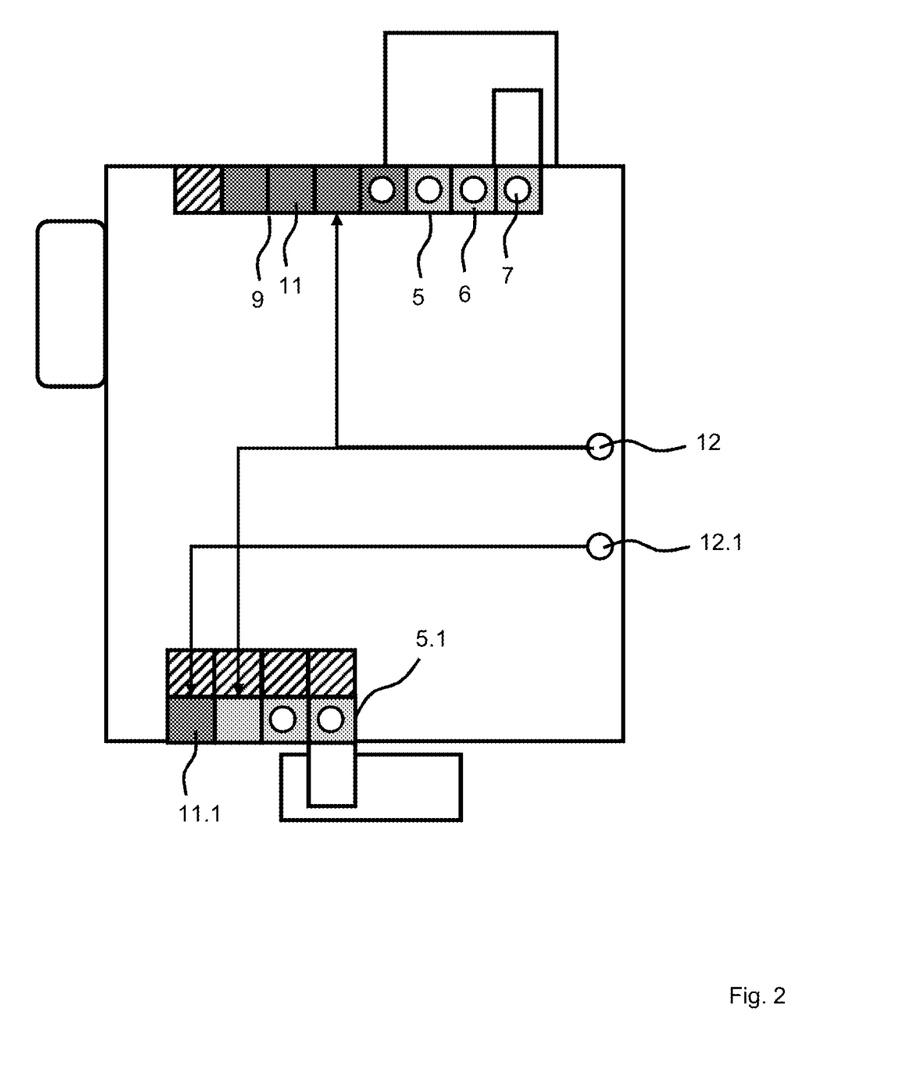
FIG. 2 is a graphical representation of a laboratory automation system with a second example of empty carrier queues and examples for traveling routes for empty carriers.

FIG. 2 shows a graphical representation of a laboratory automation system with a second example of empty carrier queues and examples for traveling routes for empty carriers. During runtime of the system, operation data are determined. For example, it is determined that the empty carrier consumption of the first device 1/transport system interface 4 increases. In reaction, a second number of additional queue spaces 11 is determined. In this case, the second number of additional queue spaces 11 is higher than the first number of additional queue spaces 10. The first empty carrier queue 5 is then operated with the first fixed number of queue spaces 6 plus the second number of additional queue spaces 11. In other words, the second number of additional queue spaces 11 replaces the first number of additional queue spaces 10. It is further determined that that the empty carrier consumption of the second device 1.1/transport system interface 4.1 stagnates. Also in this case, a second number of additional queue spaces 11.1 for the second empty carrier queue 5.1 is determined. The second number of additional queue spaces 11.1, in this case, is the same as the first number of additional queue spaces 10.1. The second empty carrier queue 5.1 is then operated with the second fixed number of queue spaces 6.1 plus the second number of additional queue spaces 11.1. In other words, the second number of additional queue spaces 11.1 of the second empty carrier queue 5.1 replaces the first number of additional queue spaces 10.1 of the second empty carrier queue 5.1. However, for the second empty carrier queue 5.1, a second number of additional queue spaces 11 may not be assigned to the second fixed number of queue spaces 6.1. The second number of additional queue spaces 11, 11.1 may be assigned to the corresponding empty carrier queue 5, 5.1 whenever an empty carrier 7 leaves the corresponding empty carrier queue 5, 5.1.

FIG. 2 also shows the case of a first empty carrier 12 being introduced into the system. It is then to be decided to which queue the newly introduced carriers 12 is to be sent/assigned to. The decision is based on the corresponding empty carrier queue 5. However, the decision may be based on the empty carrier need of each queue and the corresponding device 1/transport system interface 4, respectively. The size of the corresponding queue 5 including the additional queue spaces 11 may be indicative of the empty carrier need of the corresponding device 1/transport system interface 4. In particular, if a high number of spaces among the fixed number of queue spaces 6 and the additional number of queue spaces 11 is not occupied, the empty carrier need of the corresponding device 1/transport system interface 4 is high. For each queue 6, an empty carrier need factor is determined. The newly introduced carrier 12 is then sent/assigned to the queue 5 with the highest empty carrier need factor. A ratio between occupied (by carriers 4) and unoccupied queue spaces may be indicative of the empty carrier need (factor). Herein, the fixed number of queue spaces, the additional (first/second) number of queue spaces, or both the fixed number and the additional (first/second) number of queue spaces of a certain queue may define the queue spaces of the certain queue.

In FIG. 2, the empty carrier need (factor) of the second queue 5.1 is higher than the empty carrier need (factor) of the first queue 5. The newly introduced carrier 12 is thus sent/assigned to the second queue 5.1. However, the empty carrier need (factor) of a specific queue may be lowered, for example, proportional to the distance of the specific queue to the current position of the newly introduced carrier 12. In FIG. 2, the distance between the second queue 5.1 to the current position of the newly introduced carrier 12 is higher than the distance between the first queue 5 to the current position of the newly introduced carrier 12. This may lead to the newly introduced carrier 12 being sent/assigned to the first queue 5.

In a further situation, a first empty carrier 12.1 is introduced to the system. A request for queuing the first empty carrier 12.1 in the corresponding queue 5.1 is received. A travel time between the first empty carrier 12.1 and the corresponding queue 5.1 is calculated. The travel time exceeds a threshold. In reaction, the first empty carrier 12.1 is not assigned to a space of the fixed number of queue spaces but to the additional queue spaces of the corresponding queue 5.1. A second empty carrier 12 is introduced to the system. A request for queuing the second empty carrier 12 in the corresponding queue 5.1 is received. A travel time between the second empty carrier 12 and the corresponding queue 5.1 is calculated. The travel time does not exceed a threshold. In reaction, the second empty carrier 12 is assigned to a space of the fixed number of queue spaces. The second empty carrier 12 may be introduced to the system after the first empty carrier 12.1. However, the second empty carrier 12 may reach the corresponding queue 5.1 prior to the first empty carrier 12.1.

Figure 3:
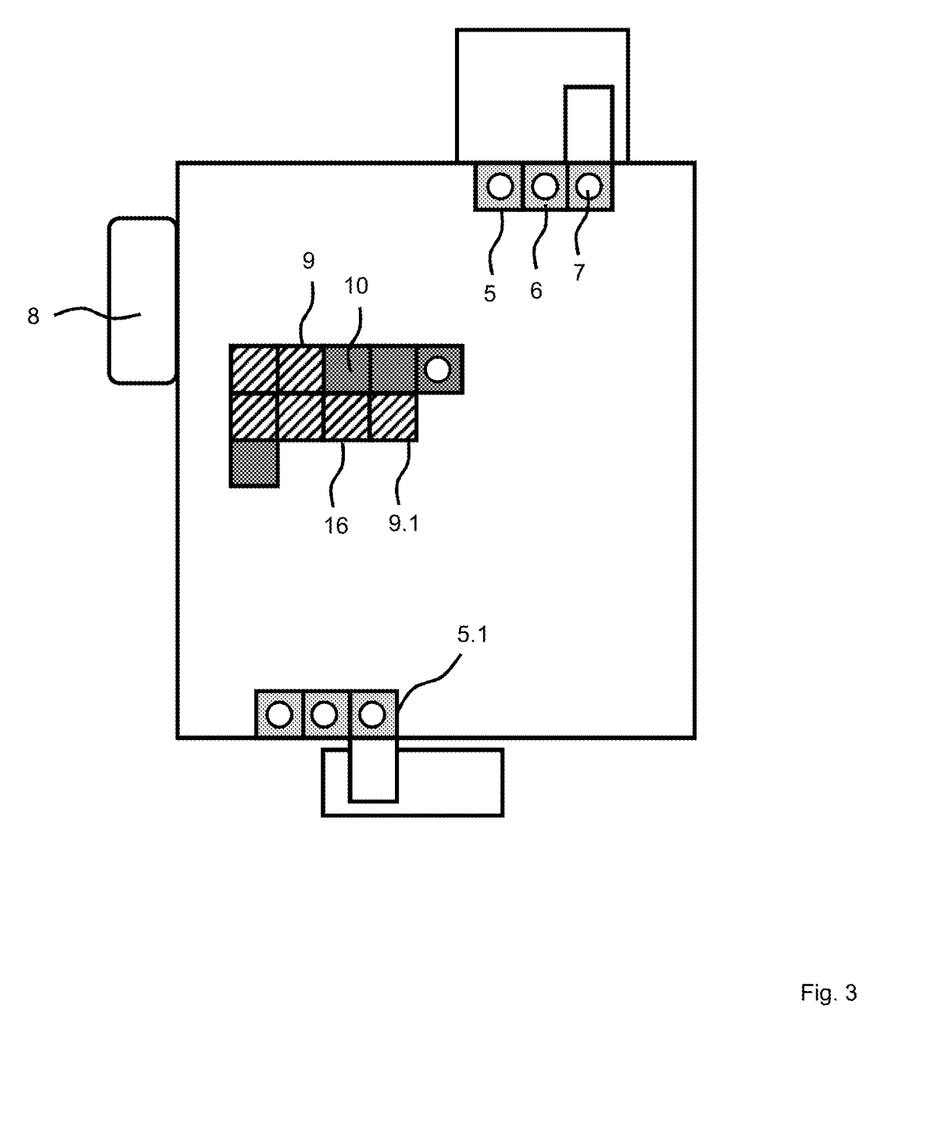
FIG. 3 is a graphical representation of a laboratory automation system with a third example of empty carrier queues.

FIG. 3 shows a graphical representation of a laboratory automation system with a third example of empty carrier queues. FIG. 3 shows a plurality of additional queue spaces 9 for a first queue 5. In addition, FIG. 3 shows a plurality of additional queue spaces 9.1 for a second queue 5.1. According to the example illustrated in FIG. 3, a set of shared queue spaces 16 comprise the additional queue spaces 9 for a first queue 5 and the additional queue spaces 9.1 for a second queue 5.1. The additional queue spaces 9, 9.1 are separated from the corresponding number of fixed queue spaces 6, 6.1, i.e., they are not adjacent to each other. However, at least one space of the additional queue spaces 9, 9.1 may be adjacent to at least one of the spaces of the corresponding number of fixed queue spaces 6, 6.1. At least one space of the additional shared queue spaces 16 may be adjacent to at least one space of the first number of fixed queue spaces 6 and at least one space of the additional shared queue spaces 16 may be adjacent to at least one space of the second number of fixed queue spaces 6.1. At least one of the spaces of the first/second number of fixed queue spaces 6, 6.1 may be adjacent to the corresponding device 1, 1.1/transport system interface 4, 4.1.

The shared queue spaces 16 may comprise a first number of additional spaces exclusively assigned to the first number of fixed queue spaces 6, a second number of additional spaces exclusively assigned to the second number of fixed queue spaces 6.1, and/or a third number of additional spaces assigned to both the first and second number of fixed queue spaces 6, 6.1. In addition, the shared queue spaces 16 may comprise a fourth number of spaces not assigned to a number of fixed queue spaces 6, 6.1. The (fourth number of spaces of the) shared queue spaces 16 may comprise spaces reserved for the first, second, and/or third number of additional spaces. In FIG. 3, the shared queue spaces 16 comprise/consist of spaces reserved for the third number of additional spaces and the third number of additional spaces.

Figure 4:
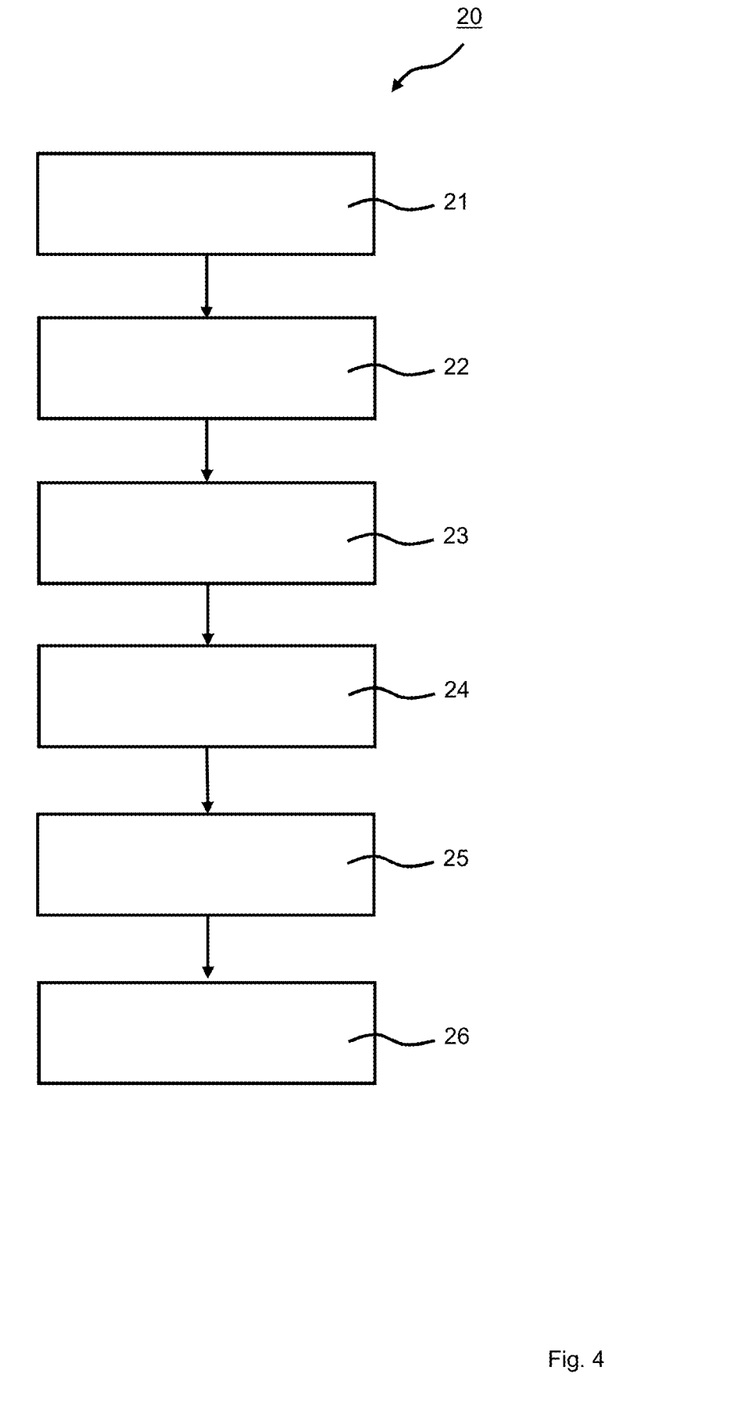
FIG. 4 is a graphical representation of a flow diagram of a method for operating a laboratory automation system.

FIG. 4 shows a graphical representation of a flow diagram of a method for operating a laboratory automation system. The method comprises providing a plurality of additional queue spaces in the transport system 21, the additional queue spaces 9 each assignable an empty carrier 7. The method further comprises assigning a first number of additional queue spaces from the plurality of additional queue spaces to the first empty carrier queue by the control device 22. Furthermore, the method comprises operating the first empty carrier queue with the first fixed number of queue spaces plus the first number of additional queue spaces during runtime of the transport system 23. In addition, the method comprises receiving operation data in the control device 24, the operation data being indicative of a first operation parameter for at least one of the transport system 2 and the plurality of laboratory devices 1 during runtime of the transport system 2, and, in response to receiving the operation data 24, assigning a second number of additional queue spaces from the plurality of additional queue spaces to the first empty carrier queue by the control device 25, wherein the second number of additional queue spaces 11 is different from the first number of additional queue spaces 10. The method further comprises operating the first empty carrier queue with the first fixed number of queue spaces plus the second number of additional queue spaces during runtime of the transport system 26.

What is claimed is:

1. A method for operating a laboratory automation system, having:
    a plurality of laboratory devices configured to apply at least one of pre-analytics, analytics, and post-analytics for a sample received in a sample container;
    a transport system, comprising
    a plurality of carriers each configured to carry one or more sample containers on an automation track to at least one of the plurality of laboratory devices;
    a plurality of transport system interfaces; and
    a first empty carrier queue provided with a first fixed number of queue spaces which each can be assigned an empty carrier; and
    a control device configured to control operation of the transport system;
    the method comprising:
    providing a plurality of additional queue spaces in the transport system, the additional queue spaces each assignable an empty carrier;
    assigning a first number of additional queue spaces from the plurality of additional queue spaces to the first empty carrier queue by the control device;
    operating the first empty carrier queue with the first fixed number of queue spaces plus the first number of additional queue spaces during runtime of the transport system;
    receiving operation data in the control device, the operation data being indicative of a first operation parameter for at least one of the transport system and the plurality of laboratory devices during runtime of the transport system;
    in response to receiving the operation data, assigning a second number of additional queue spaces from the plurality of additional queue spaces to the first empty carrier queue by the control device, wherein the second number of additional queue spaces is different from the first number of additional queue spaces; and
    operating the first empty carrier queue with the first fixed number of queue spaces plus the second number of additional queue spaces during runtime of the transport system.

2. The method of claim 1, further comprising, in the control device,
    receiving a request for queuing a first carrier in the first empty carrier queue;
    determining a travel time for the first carrier for travelling from a current location to the location of the of the first empty carrier queue in the transport system; and
    assigning the first carrier to one of the first number of additional queue spaces and the second number of additional queue spaces, if the travel time is exceeding a threshold travel time.

3. The method of claim 1, wherein the providing of the plurality of additional queue spaces further comprises providing a plurality of additional shared queue spaces shared between the first empty carrier queue and a second empty carrier queue of the transport system, the second empty carrier queue provided with a second fixed number of queue spaces which each can be assigned an empty carrier in the transport system.

4. The method of claim 3, further comprising dynamically assigning, by the control device, one or more additional shared queue spaces from the plurality of additional shared queue spaces to both the first empty carrier queue and the second empty carrier queue depending on at least one of the first operation parameter and a second operation parameter for at least one of the transport system and the plurality of laboratory devices at runtime.

5. The method of claim 1, the receiving of the operation data in the control device further comprising one of the first operation parameter and the second operation parameter being indicative of at least one of the following operation parameters:
    a physical filling level for at least one of the first empty carrier queue and the second empty carrier queue, the physical filling level indicating the number of empty carriers provided in the first empty carrier queue/second empty carrier queue;
    a virtual filling level for at least one of the first empty carrier queue and the second empty carrier queue, the virtual filling level indicating a total number of empty carriers assigned to the first empty carrier queue/second empty carrier queue, namely the number of empty carriers provided in the first empty carrier queue/second empty carrier queue plus a number of empty carriers travelling to the first empty carrier queue/second empty carrier queue;
    a first additional queue space capacity indicating a first remaining number of additional queue spaces from the first number of additional queue spaces not assigned by an empty carrier;
    a second additional queue space capacity indicating a second remaining number of additional queue spaces from the second number of additional queue spaces not assigned by an empty carrier; and
    a number of empty carriers which left one of the first empty carrier queue and the second empty carrier queue over an observation time period.

6. The method of claim 1, wherein the assigning of the first number of additional queue spaces comprises at least one of the following:
    assigning a first number of additional queue spaces which is zero at the time of starting runtime; and
    assigning a first number of additional queue spaces which is non-zero.

7. The method of claim 1, further comprising, in the control device, at last one of the following:
    assigning the first empty carrier queue a first transport system interface from the plurality of transport system interfaces; and
    assigning the second empty carrier queue a second transport system interface from the plurality of transport system interfaces, wherein the second transport system interface is different from the first transport system interface.

8. The method of claim 7, the assigning of the second number of additional queue spaces further comprising, in the control device, determining the second number of additional queue spaces ($L_{additional}$) as follows:

$$L_{additional} = \frac{\dot{Q}_{TSIF}}{\dot{Q}_{TSIF,max}} \cdot \frac{D_{average,TSIF}}{D_{avergae}} \cdot L_{additional,ref},$$

wherein:

$\dot{Q}_{TSIF}$ is the number of empty carriers leaving the first empty carrier queue in an output direction via the first transport system interface per time unit;

$\dot{Q}_{TSIF,max}$ is the maximum number of empty carriers leaving the first empty carrier queue in an output direction via the first transport system interface per time unit;

$D_{average,TSIF}$ is the average distance between the first transport system interface assigned to the first empty carrier queue and the other transport system interfaces from the plurality of transport system interfaces;

$D_{average}$ is the average distance between pairs of transport system interfaces from the plurality of transport system interfaces; and $L_{additional,ref}$ is a reference number of additional queue spaces.

9. The method of claim 8, wherein the reference number of additional queue spaces ($L_{additional,ref}$) is determined as follows:

$$L_{additional,ref} = \max\left(1, \frac{D_{max} + D_{average}}{6}\right),$$

wherein $D_{max}$ is the maximum distance between a pair of transport system interfaces from the plurality of transport system interfaces.

10. The method of claim 8, further comprising limiting the second number of additional queue spaces ($L_{additional}$) as follows: $L_{additional} \leq 2 \cdot L_{additional,ref}$.

11. The method of claim 1, wherein the assigning of the second number of additional queue spaces further comprises assigning the second number of additional queue spaces in response to an empty carrier leaving the first empty carrier queue.

12. The method of claim 1, further comprising providing the plurality of carriers as a plurality of sample container carriers.

13. The method of claim 1, wherein the operating of the first empty carrier queue further comprises, in the control device, directing one or more empty carriers located distant from the first empty carrier queue to travel to the first empty carrier queue, if the second number of additional queue spaces is determined to be higher than the first number of additional queue spaces.

14. The method of claim 1, wherein the operating of the first empty carrier queue further comprises, in the control device, preventing one or more empty carriers located distant from the first empty carrier queue from traveling to the first empty carrier queue, if the second number of additional queue spaces is determined to be smaller than the first number of additional queue spaces.

15. A laboratory automation system, having:
a plurality of laboratory devices configured to apply at least one of pre-analytics, analytics, and post-analytics for a sample received in a sample container;
a transport system, comprising
a plurality of carriers each configured to carry one or more sample containers on an automation track to at least one of the plurality of laboratory devices;
a plurality of transport system interfaces; and
a first empty carrier queue provided with a first fixed number of queue spaces which each can be assigned an empty carrier; and
a control device configured to control operation of the transport system;
the laboratory automation system being configured to:
provide a plurality of additional queue spaces in the transport system, the additional queue spaces each assignable an empty carrier;
assign a first number of additional queue spaces from the plurality of additional queue spaces to the first empty carrier queue by the control device;
operate the first empty carrier queue with the first fixed number of queue spaces plus the first number of additional queue spaces during runtime of the transport system;
receive operation data in the control device, the operation data being indicative of a first operation parameter for at least one of the transport system and the plurality of laboratory devices during runtime of the transport system;
in response to receiving the operation data, assign a second number of additional queue spaces from the plurality of additional queue spaces to the first empty carrier queue by the control device, wherein the second number of additional queue spaces is different from the first number of additional queue spaces; and
operate the first empty carrier queue with the first fixed number of queue spaces plus the second number of additional queue spaces during runtime of the transport system.

* * * * *